United States Patent
Salter et al.

(10) Patent No.: US 11,440,479 B2
(45) Date of Patent: Sep. 13, 2022

(54) STORAGE SYSTEM FOR A VEHICLE WALL

(71) Applicant: Ford Global Technologies, LLC, Dearborn, MI (US)

(72) Inventors: Stuart C. Salter, White Lake, MI (US); David Brian Glickman, Southfield, MI (US); Hussein H. Berry, Dearborn, MI (US); Aaron Halonen, Brighton, MI (US); Paul Kenneth Dellock, Northville, MI (US); Annette Lynn Huebner, Highland, MI (US); Sarah A. Ripley, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/173,912

(22) Filed: Feb. 11, 2021

(65) Prior Publication Data

US 2022/0250549 A1 Aug. 11, 2022

(51) Int. Cl.
*B60R 9/02* (2006.01)
*B60R 7/02* (2006.01)
*B60P 7/15* (2006.01)
*B60R 11/06* (2006.01)

(52) U.S. Cl.
CPC .............. *B60R 9/02* (2013.01); *B60P 7/15* (2013.01); *B60R 7/02* (2013.01); *B60R 11/06* (2013.01)

(58) Field of Classification Search
CPC ... B60R 7/02; B60R 9/02; B60R 11/06; B60P 7/15
USPC .................. 224/404, 543; 296/37.6
See application file for complete search history.

(56) References Cited

U.S. PATENT DOCUMENTS

| | | | | |
|---|---|---|---|---|
| 4,685,695 A | * | 8/1987 | LeVee | B62D 53/0828 296/37.6 |
| 4,789,195 A | * | 12/1988 | Fletcher | B60R 11/06 224/543 |
| 5,316,358 A | * | 5/1994 | Payne | B60R 5/00 296/24.45 |
| 5,398,987 A | * | 3/1995 | Sturgis | B60R 9/00 224/404 |
| 5,492,257 A | * | 2/1996 | Demick | B60R 7/02 296/37.16 |
| 5,524,951 A | * | 6/1996 | Johnson | B60R 9/00 296/183.1 |
| 5,615,922 A | * | 4/1997 | Blanchard | B60R 9/02 224/404 |

(Continued)

FOREIGN PATENT DOCUMENTS

WO 201281120 6/2012

*Primary Examiner* — Justin M Larson
(74) *Attorney, Agent, or Firm* — Vichit Chea; Carlson, Gaskey & Olds, P.C.

(57) ABSTRACT

A vehicle assembly includes a wall of a cargo bed, and a storage system. The wall has an inner panel spaced from an outer panel to provide a cavity. The storage system has a first bin and a second bin that are each at least partially disposed within the cavity when in an installed position. The first bin provides a first cargo area within the cavity when in the installed position. The first bin is configured to be moved to the installed position through an aperture in the inner panel. The second bin provides a second cargo area within the cavity when in the installed position. The second bin is configured to be moved to the installed position without moving through the aperture in the inner panel.

20 Claims, 7 Drawing Sheets

(56) References Cited

U.S. PATENT DOCUMENTS

| | | | | |
|---|---|---|---|---|
| 5,634,577 A * | 6/1997 | Pearson, Jr. | ............ | B60R 11/06 224/403 |
| 5,732,764 A * | 3/1998 | Douglas | ............. | B60H 1/00014 165/41 |
| 5,795,005 A * | 8/1998 | Garfias | ................... | B60R 7/046 312/275 |
| 5,800,004 A * | 9/1998 | Ackeret | ................... | B60R 7/12 296/37.13 |
| 5,826,931 A * | 10/1998 | Perlman | ................. | B62D 33/03 296/57.1 |
| 5,848,818 A * | 12/1998 | Flueckinger | .............. | B60R 9/00 296/37.6 |
| 5,941,589 A * | 8/1999 | Perlman | ................. | B60R 11/00 296/37.6 |
| 5,951,085 A * | 9/1999 | Fukatsu | ................... | B60R 7/02 296/37.8 |
| 6,003,923 A * | 12/1999 | Scott | ....................... | B60R 11/06 296/37.6 |
| 6,059,341 A * | 5/2000 | Jensen | ...................... | B60P 3/14 292/29 |
| 6,065,942 A * | 5/2000 | Glidden | ................. | F04B 41/02 417/236 |
| 6,079,741 A * | 6/2000 | Maver | ............... | B62D 49/0628 224/404 |
| 6,129,401 A * | 10/2000 | Neag | ........................ | B60N 3/08 296/183.1 |
| 6,203,087 B1 * | 3/2001 | Lance | ..................... | B60R 11/00 224/403 |
| 6,447,051 B1 * | 9/2002 | Lukomskiy | .............. | B60P 3/40 296/183.1 |
| 6,464,276 B1 * | 10/2002 | Gruich | ................ | B62D 33/0273 224/403 |
| 6,485,077 B1 * | 11/2002 | Foster | .................... | B62D 33/02 296/183.1 |
| 6,543,829 B2 * | 4/2003 | Brown | ................... | B60R 11/06 296/146.13 |
| 6,550,837 B1 * | 4/2003 | Preiss | ...................... | B60P 3/14 296/37.6 |
| 6,561,399 B1 | 5/2003 | Loosbrock | | |
| 6,695,375 B1 * | 2/2004 | May | ....................... | B60R 11/06 224/403 |
| 6,749,241 B1 * | 6/2004 | Erlandsson | .............. | B60R 7/02 410/129 |
| 6,830,418 B2 | 12/2004 | Keramidis | | |
| 6,859,009 B2 * | 2/2005 | Jablin | .................... | G07B 15/00 439/34 |
| 6,942,270 B1 * | 9/2005 | Mulvihill | ................. | B60R 7/02 224/543 |
| 6,966,593 B2 * | 11/2005 | Plentis | ....................... | B60R 9/02 296/37.6 |
| 7,118,150 B2 * | 10/2006 | Bruford | .................... | B60R 3/02 296/37.1 |
| 7,121,601 B2 * | 10/2006 | Mulvihill | .................. | B60R 7/02 296/37.16 |
| 7,631,920 B2 * | 12/2009 | Norman | .................... | B60R 7/04 296/37.8 |
| 7,651,146 B2 | 1/2010 | Anderson et al. | | |
| 7,708,329 B2 | 5/2010 | Duller | | |
| 7,762,601 B2 * | 7/2010 | Shea | ....................... | B60R 11/06 296/37.16 |
| 9,120,510 B1 * | 9/2015 | Gillam | ..................... | B60R 9/02 |
| 9,126,535 B1 * | 9/2015 | Moore | ................. | B62D 25/168 |
| 9,193,290 B2 * | 11/2015 | Lazarevich | ............... | B60P 3/14 |
| 9,333,924 B2 * | 5/2016 | Beasley | ................ | B60R 11/00 |
| 10,000,159 B2 * | 6/2018 | Hellman | .................. | F25D 3/08 |
| 10,029,618 B2 * | 7/2018 | Perez Astudillo | ...... | B60R 5/048 |
| 10,160,390 B2 * | 12/2018 | Na | ............................ | B60R 7/005 |
| 10,173,603 B2 * | 1/2019 | Dunham | ................ | B60R 9/065 |
| 10,272,861 B2 * | 4/2019 | Wymore | ................ | B60R 9/065 |
| 10,974,653 B2 * | 4/2021 | Scaringe | ................ | B60R 5/00 |
| 11,021,109 B2 * | 6/2021 | H N | .......................... | B60R 7/043 |
| 11,186,227 B2 * | 11/2021 | Cho | .......................... | B60R 7/02 |
| 2001/0013709 A1 * | 8/2001 | Clare | ..................... | B62D 33/02 296/183.1 |
| 2005/0052045 A1 * | 3/2005 | Juzwiak | ................... | B60R 9/02 296/37.6 |
| 2009/0189404 A1 * | 7/2009 | Anderson | ................ | B60R 7/02 296/37.6 |
| 2010/0193555 A1 | 8/2010 | Gift | | |
| 2015/0375687 A1 * | 12/2015 | Gillam | ................ | B62D 33/023 296/37.6 |
| 2015/0375690 A1 * | 12/2015 | Beasley | ................... | B60R 9/02 296/37.6 |
| 2016/0009231 A1 * | 1/2016 | Perron | ................... | B60R 11/06 296/37.6 |
| 2017/0253196 A1 * | 9/2017 | Barrow | ..................... | B60R 7/02 |
| 2018/0222293 A1 * | 8/2018 | Thomas | .................. | B60N 2/78 |
| 2019/0232851 A1 * | 8/2019 | Frederick | ................. | B60R 7/02 |
| 2019/0366981 A1 * | 12/2019 | Huang | ................... | E05B 77/44 |
| 2020/0324705 A1 * | 10/2020 | Lee | ........................... | B60R 5/044 |
| 2020/0324706 A1 * | 10/2020 | Cho | .......................... | B60R 7/04 |

* cited by examiner

STORAGE SYSTEM FOR A VEHICLE WALL

TECHNICAL FIELD

This disclosure relates generally to storage for a vehicle and, more particularly, a multi-piece storage system that can provide a storage area within a wall of a vehicle.

BACKGROUND

Vehicles, such as pickup trucks, can include a cargo bed. The cargo bed can be provided aft of a passenger compartment, and between walls of the vehicle. A tailgate can enclose an aft end of the cargo bed when the tailgate is in a closed position.

SUMMARY

A vehicle assembly includes, among other things, a wall of a cargo bed, and a storage system. The wall has an inner panel spaced from an outer panel to provide a cavity. The storage system has a first bin and a second bin that are each at least partially disposed within the cavity when in an installed position. The first bin provides a first cargo area within the cavity when in the installed position. The first bin is configured to be moved to the installed position through an aperture in the inner panel. The second bin provides a second cargo area within the cavity when in the installed position. The second bin is configured to be moved to the installed position without moving through the aperture in the inner panel.

In another example of the foregoing vehicle assembly, the first bin is snap-fit to the second bin when the first and second bins are in the installed position.

In another example of any of the foregoing vehicle assemblies, the second bin provides part of a wheel well liner when the second bin is in the installed position.

Another example of any of the foregoing assemblies includes a lid that is movable back-and-forth between a closed position and an open position. The lid covers an opening to the first cargo area when in the closed position. The lid provides access to the first cargo area through the opening when the lid is in the open position.

Another example of any of the foregoing assemblies includes a hinge system that couples the lid relative to the inner panel such that the lid can move back-and-forth between the closed position and the open position. The hinge system biases the lid to the closed position.

Another example of any of the foregoing assemblies includes a frame that is movable back-and-forth between a stowed position and a deployed position. The hinge system couples the frame relative to the inner panel.

In another example of any of the foregoing assemblies, the frame is an extendable frame that can extend and retract.

In another example of any of the foregoing assemblies, the frame extends circumferentially continuously about a frame aperture. The frame is configured to extend to increase a size of the frame aperture, and is configured to retract to decrease a size of the frame aperture.

In another example of any of the foregoing assemblies, the frame is configured to fold over itself when in the stowed position.

Another example of any of the foregoing assemblies includes a lock assembly that transitions back-and-forth between locked position and an unlocked position. The lock assembly is configured to hold the lid in the closed position when the lock assembly is in the locked position. The lid is movable from the closed position to the open position when the lock assembly is in the unlocked position. The lock assembly is configured to transition from the locked position to the unlocked position in response to a vehicle that has the vehicle assembly detecting an authorized user.

Another example of any of the foregoing assemblies includes a camera of the vehicle that captures images of the cargo bed and areas proximate the cargo bed. The lock assembly is configured to transition at least in part in response to the authorized user being detected using the camera.

In another example of any of the foregoing assemblies, the first bin is configured to telescope back-and-forth between an extended position and a retracted position. The first bin extends further from the cavity into the cargo area when the first bin is in the extended position than when the first bin is in the retracted position.

Another example of any of the foregoing assemblies includes a cord that is held within the first cargo area, the second cargo area, or both.

Another example of any of the foregoing assemblies includes a traction battery of a vehicle having the cord. The traction battery is configured to be charged using the cord. The cord is configured to be held on a reel within the first cargo area when stored.

Another example of any of the foregoing assemblies includes a heater configured to be selectively held within the cavity in place of the first bin, in place of the second bin, or both.

A method of installing a vehicle assembly according to another exemplary aspect of the present disclosure includes, among other things, moving a first bin through an aperture and inner panel of a wall into an installed position such that the first bin is at least partially disposed within a cavity between the inner panel and an outer panel wall. The method further includes, without moving a second bin through the aperture, moving the second bin into an installed position such that the second bin is at least partially disposed within the cavity. The method further includes securing the first bin and the second bin relative to each other to provide a storage system.

Another example of the foregoing method includes snap-fitting the first bin and the second bin when securing the first bin and the second bin relative to each other.

Another example of the foregoing method includes moving the second bin through a wheel well area when moving the second bin to the installed position.

In another example of any of the foregoing methods, the second bin provides a part of a wheel well liner when the second bin is in the installed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary vehicle assembly associated with a wall of a cargo bed, such as a wall of a pickup truck cargo bed. The vehicle assembly includes a storage system or "cubby."

Although described in connection with a pickup truck cargo bed, the cargo bed could be within another type of vehicle, such as a cargo bed within a trunk of a car, or a cargo bed within a frunk of an electrified vehicle.

The storage system has a first bin and a second bin. The first bin can be installed through an inner panel of the wall, while the second bin can be moved to an installed position without passing through the aperture in the inner panel. The multipiece design of the storage system, among other things, facilitates assembly. The positioning of the storage system within the wall of the cargo bed helps to mitigate assembly and packaging issues.

Figure 1:
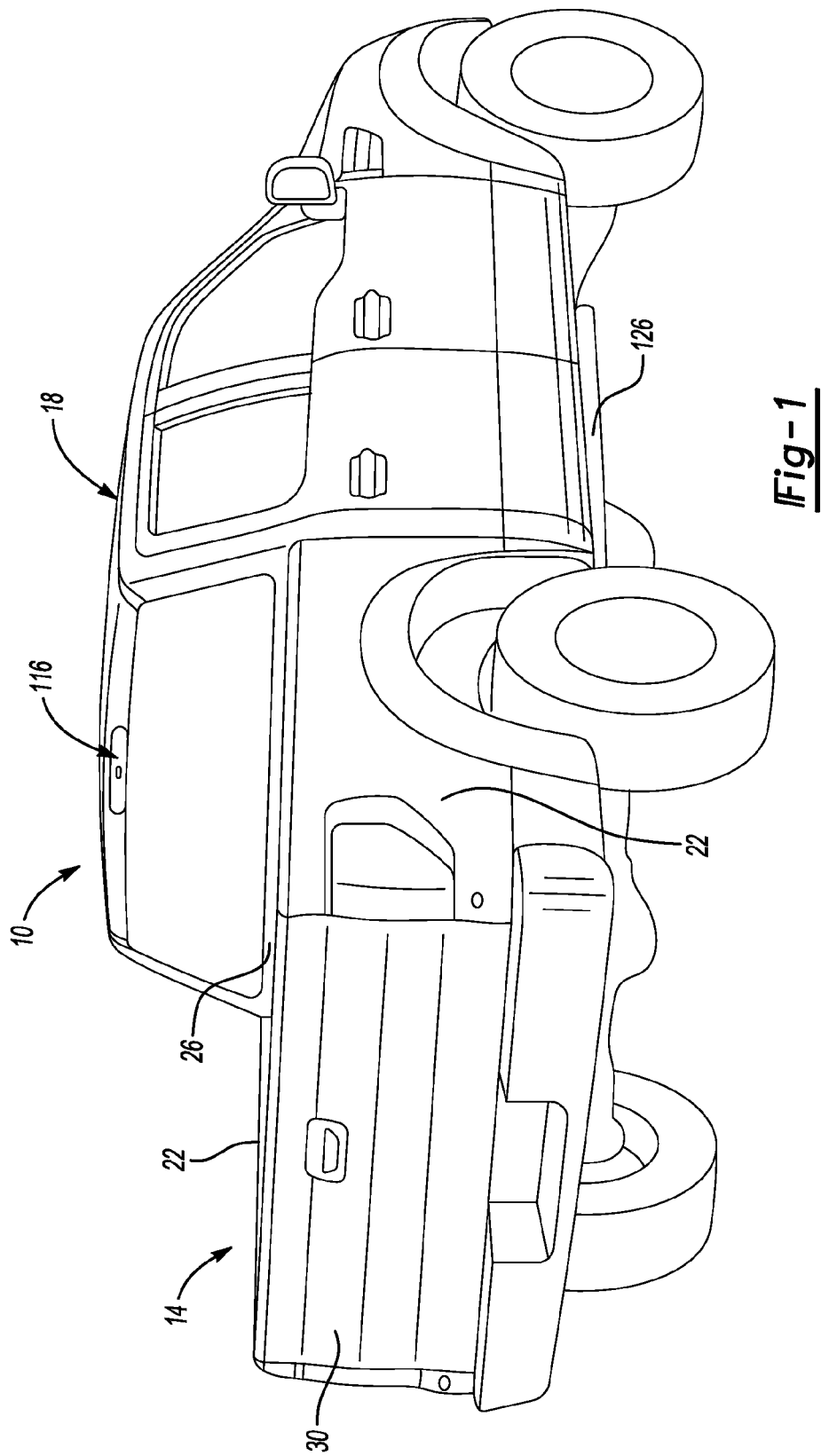
FIG. 1 shows a perspective view of a vehicle having a cargo bed.

With reference to FIG. 1, a vehicle 10, here a pickup truck, includes a cargo bed 14 aft a passenger compartment 18 of the vehicle 10. The cargo bed 14 is generally defined by side walls 22, a front wall 26, and a tailgate 30, which acts as a rear wall when closed. The cargo bed 14 can be utilized to transport various types of cargo.

Figure 2:
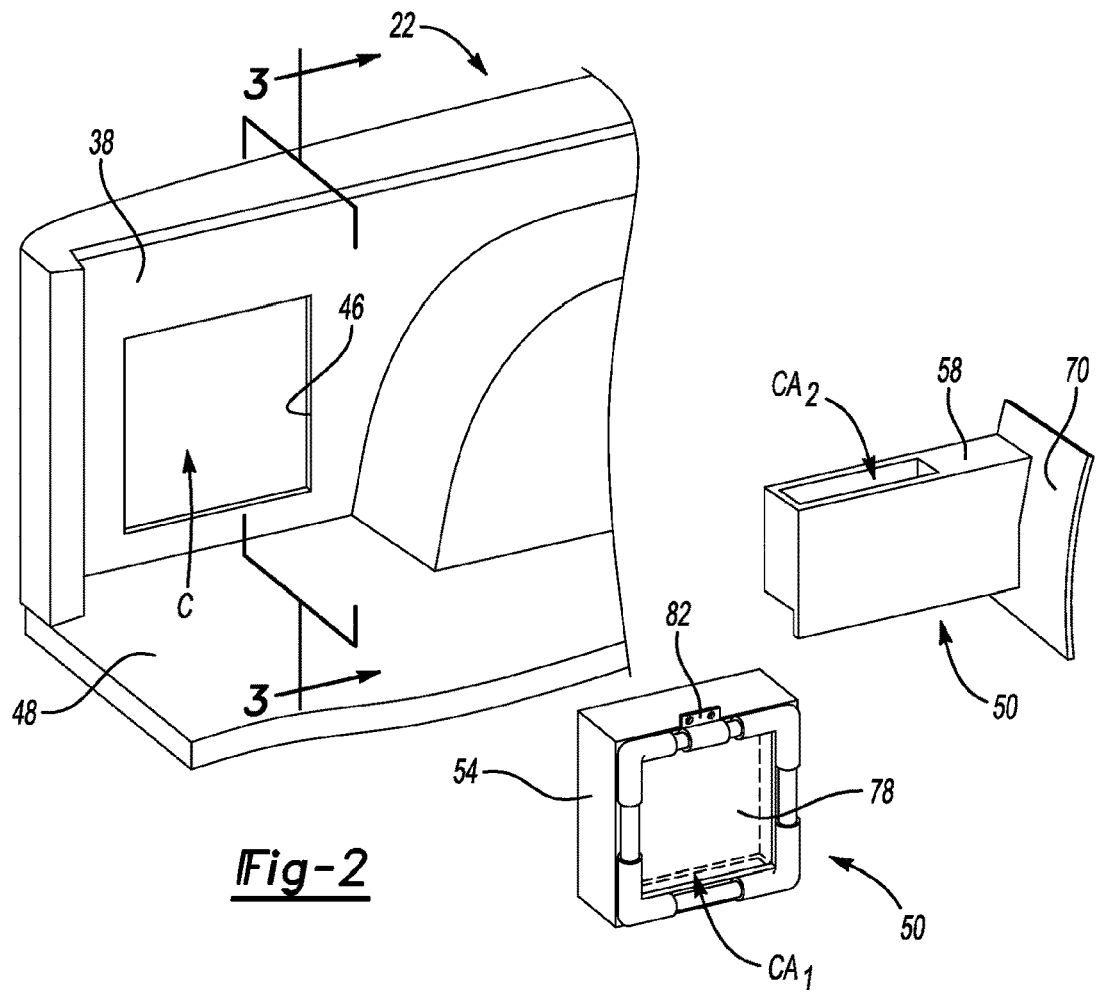
FIG. 2 shows a close-up view of a portion of a wall of the cargo bed in FIG. 1 and additionally shows a storage system in an uninstalled position.
Figure 3:
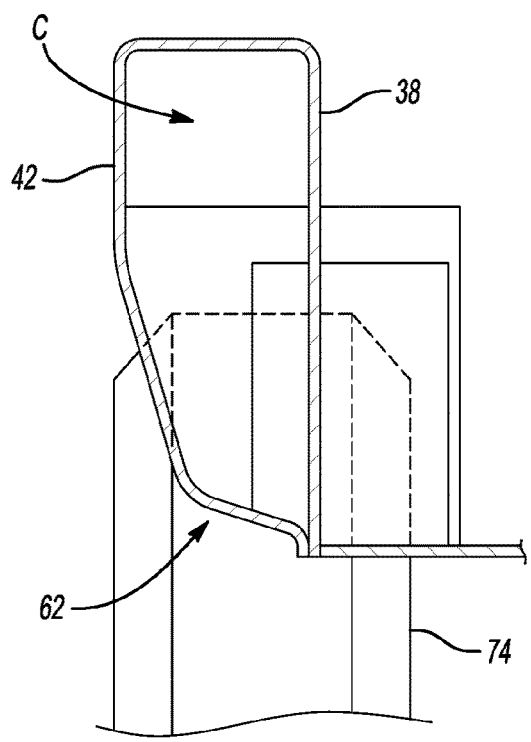
FIG. 3 shows a section view taken at line 3-3 in FIG. 2.

With reference now to FIGS. 2 and 3 and continuing reference to FIG. 1, the side walls 22 each include an inner panel 38 spaced from an outer panel 42 to provide a cavity C. FIGS. 2 and 3 illustrate selected portions of the side wall 22 that is on a driver side of the vehicle 10. The side wall 22 on a passenger side of the vehicle 10 is constructed similarly to the side wall 22 on the driver side.

The inner panel 38 includes an aperture 46. The cavity C opens to the cargo bed 14 through the aperture 46. A circumferential perimeter of the aperture 46 is provided entirely by the inner panel 38 in the exemplary embodiment. In other embodiments, the aperture 46 may have its perimeter partially provided by the inner panel 38. A remaining perimeter of the aperture 46 may be provided by another structure, such as a floor 48 of the cargo bed, or could remain undefined.

A storage system 50 includes, in the exemplary embodiment, a first bin 54 and a second bin 58. The first bin 54 provides a first cargo area $CA_1$. The second bin 58 provides a second cargo area $CA_2$.

Figure 4:
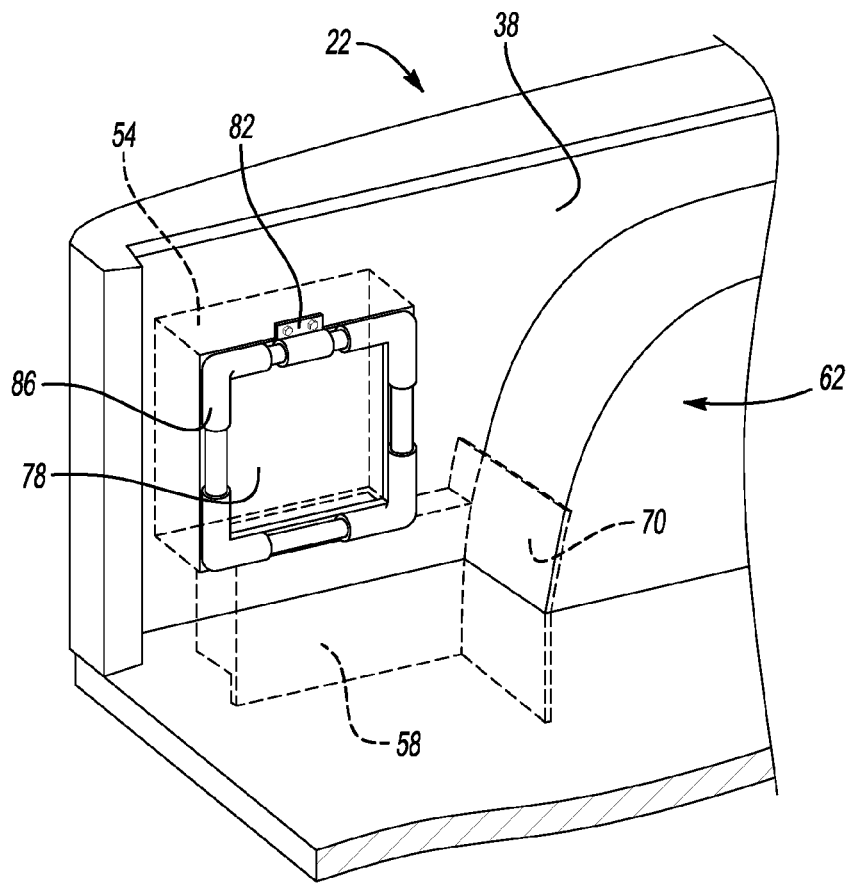
FIG. 4 shows the wall portion of FIG. 2 with the storage system of FIG. 2 in an installed position.

The first bin 54 is configured to be moved from an uninstalled position as shown in FIG. 2, through the aperture 46 in the inner panel 38, into an installed position as shown in FIG. 4. The second bin 58 is configured to move from an uninstalled position shown in FIG. 2 to the installed position FIG. 4 without moving the second bin 58 through the aperture 46.

The cargo area $CA_1$ opens to the cargo area $CA_2$. A user can access the cargo area $CA_2$ of the second bin 58 through the cargo area $CA_1$ of the first bin 54. Thus, when the first bin 54 is in the installed position and the second bin 58 is in the installed position, the cargo areas $CA_1$ and $CA_2$ provide a combined cargo area for the storage system 50 within the cavity C.

Relying on the multiple bin pieces (rather than a single bin piece) to provide a cargo area can facilitate assembly. A single piece bin providing a similarly sized cargo area to the combined cargo areas $CA_1$ and $CA_2$ would, for example, face installation challenges.

An exemplary method of installing the storage system 50 includes moving the first bin 54 through the aperture 46 in the inner panel 38 of the side wall 22 into an installed position. In the installed position, the first bin 54 is disposed within the cavity C. Next, without moving the second bin 58 through the aperture 46, the method includes moving the second bin 58 into the installed position such that the second bin 58 is also partially disposed within the cavity C between the inner panel 38 and the outer panel 42. The method then includes securing the first bin 54 and the second bin 58 relative to each other within the cavity C to provide the storage system.

When the first bin 54 and the second bin 58 are in the installed position shown in FIG. 4, the first bin 54 can be snap-fit to the second bin 58. A person having skill in the art would understand how to incorporate snap-fit features into components. Although described as snap-fit together, the first bin 54 and the second bin 58 could be joined in other ways.

The second bin 58, as mentioned above, can move to the installed position of FIG. 4 without moving through the aperture 46 in the inner panel 38. In this example, the second bin 58 moves to the installed position of FIG. 4 through a wheel well area 62 of the vehicle.

In the exemplary embodiment, when the second bin 58 is in the installed position of FIG. 4, a portion of the second bin 58 provides part of a wheel well liner 70 for the vehicle 10. The portion provides part of the wheel well liner 70 extending circumferentially about a driver side rear wheel 74 of the vehicle 10.

Figure 5:
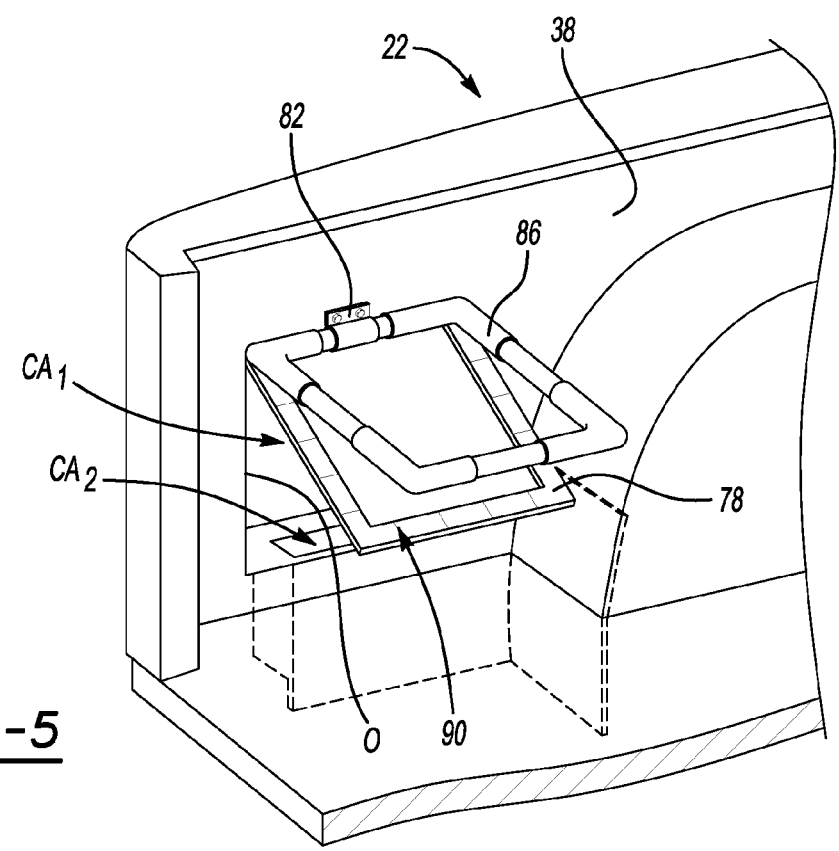
FIG. 5 shows a lid of the storage system of FIG. 4 in an open position and a frame of the storage system in a deployed position.

With reference now to FIG. 5, and continuing reference to FIG. 4, the storage system additionally includes, in this example, a lid 78 that is movable back-and-forth between a closed position as shown in FIG. 4 and one of several open positions, one of which is shown in FIG. 5. The lid 78 covers an opening O to the first cargo area $CA_1$ when the lid 78 is in the closed position. When the lid 78 is in an open position, the first cargo area $CA_1$, and thus the second cargo area $CA_2$, can be accessed through the opening O.

A hinge system 82 couples the lid 78 relative to the inner panel 38 and the first bin 54. The hinge system 82 couples the lid 78 to the first bin 54 such that the lid 78 can move back-and-forth between the closed position of FIG. 4 and an open position, such as the open position shown in FIG. 5.

The hinge system 82 can, in some examples, incorporate a biasing element, such as a spring, that biases the lid 78 to the closed position of FIG. 4. The biasing element of the hinge system 82 snaps the lid 78 back to the closed position when a user, for example, is not holding the lid 78 in an open position.

Figure 6:
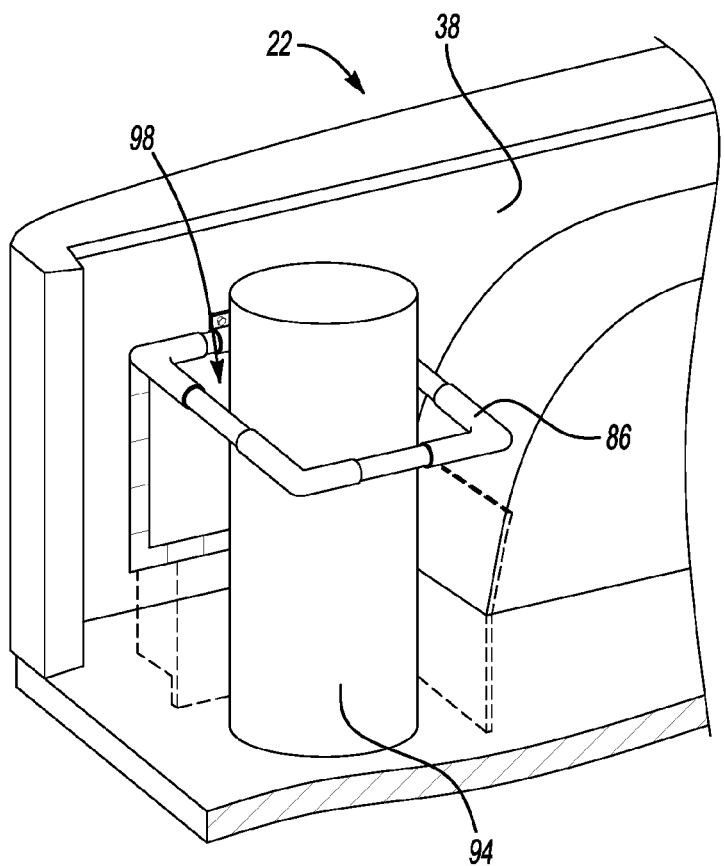
FIG. 6 shows the frame of FIG. 5 when the frame is holding cargo.

The storage system additionally includes, in the exemplary embodiment, a frame 86. The hinge system 82 couples the frame 86 relative to the inner panel 38 and the first bin 54 such that the frame 86 is movable back-and-forth between a stowed position as shown in FIG. 4 and a deployed position as shown in FIG. 5 and FIG. 6. The hinge system can include bolts or snaps to secure the frame 86 relative to the lid 78.

In this example, the frame 86 can pivot about an axis of the hinge system 82 separately from the lid 78. When the lid 78 is in the closed position of FIG. 4 and the frame 86 is in the stowed position, the frame 86 can rest at least partially within a recessed area 90 of the lid 78. In the deployed position, the frame 86 can be used to hold cargo 94 as shown in FIG. 6. The lid 78 can be closed when the frame 86 is holding cargo 94, or can be opened to enable the held cargo to extend into the cavity C.

The frame 86 extends circumferentially continuously about a frame aperture 98. To hold the cargo 94, the cargo 94 can be positioned within the frame aperture 98 of the exemplary frame 86.

Figure 7:
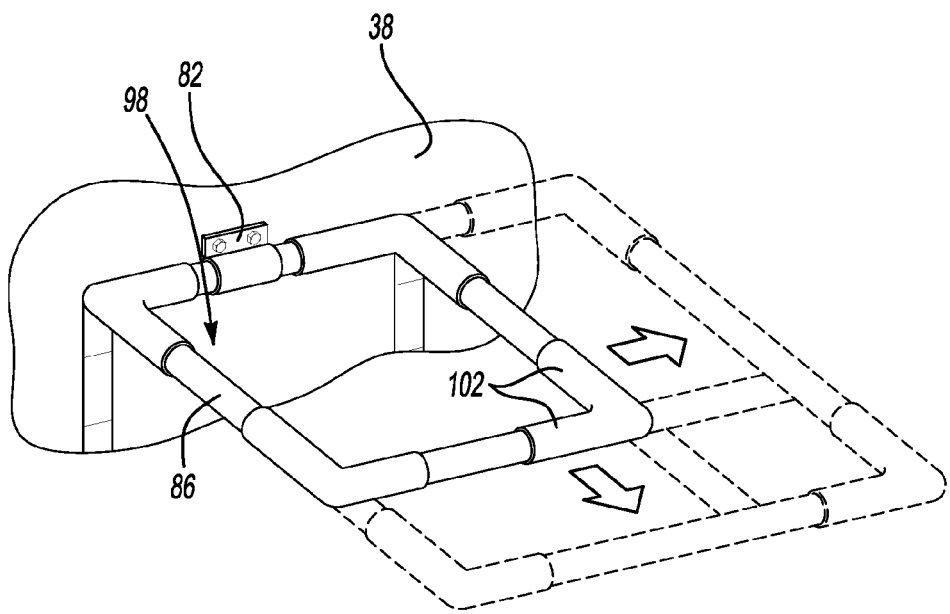
FIG. 7 shows how the frame of FIG. 5 can extend and retract.

In some examples, the frame 86 is extendable and retractable as shown in FIG. 7. Extending and retracting the frame 86 can adjust the size of the frame aperture 98 to accommodate cargo of various sizes. The extendable frame 86 can include squeeze handles 102 that actuate release locking mechanisms to allow extension and retraction of the frame 86. In this example, the frame can extend in two directions, which are forward and aft, and cross-vehicle in FIG. 7.

Like the lid 78, the hinge system 82 can include a biasing member that biases the frame 86 to the stowed position. The biasing force can help to hold the cargo 94 if the biasing due to the biasing member pulls the frame 86 against the cargo 94.

Figure 8:
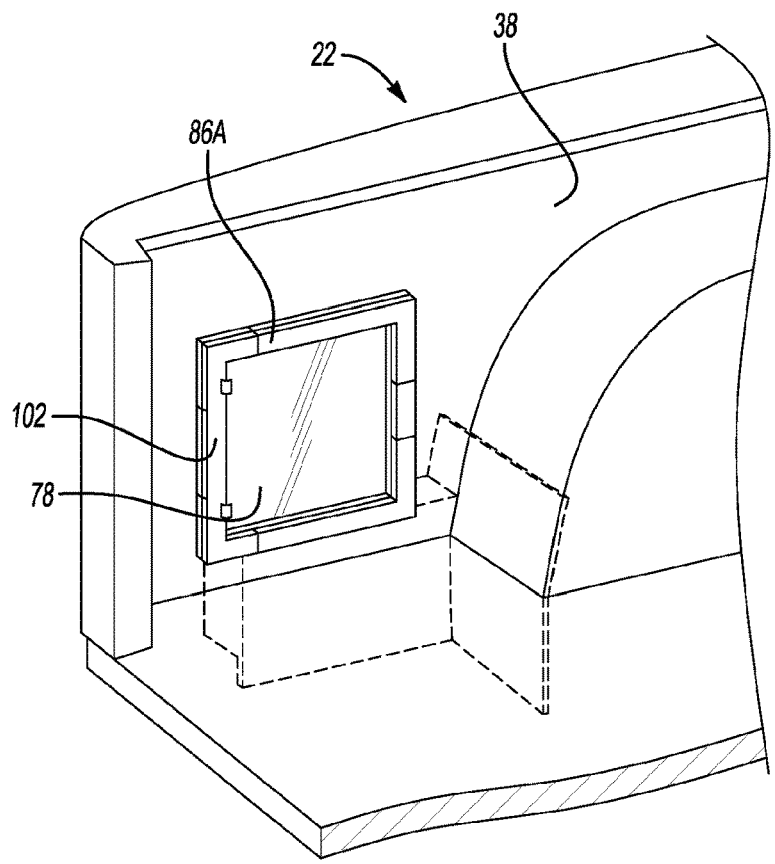
FIGS. 8 and 9 show the frame of FIG. 5-7 according to yet another exemplary aspect of the present disclosure.
Figure 9:
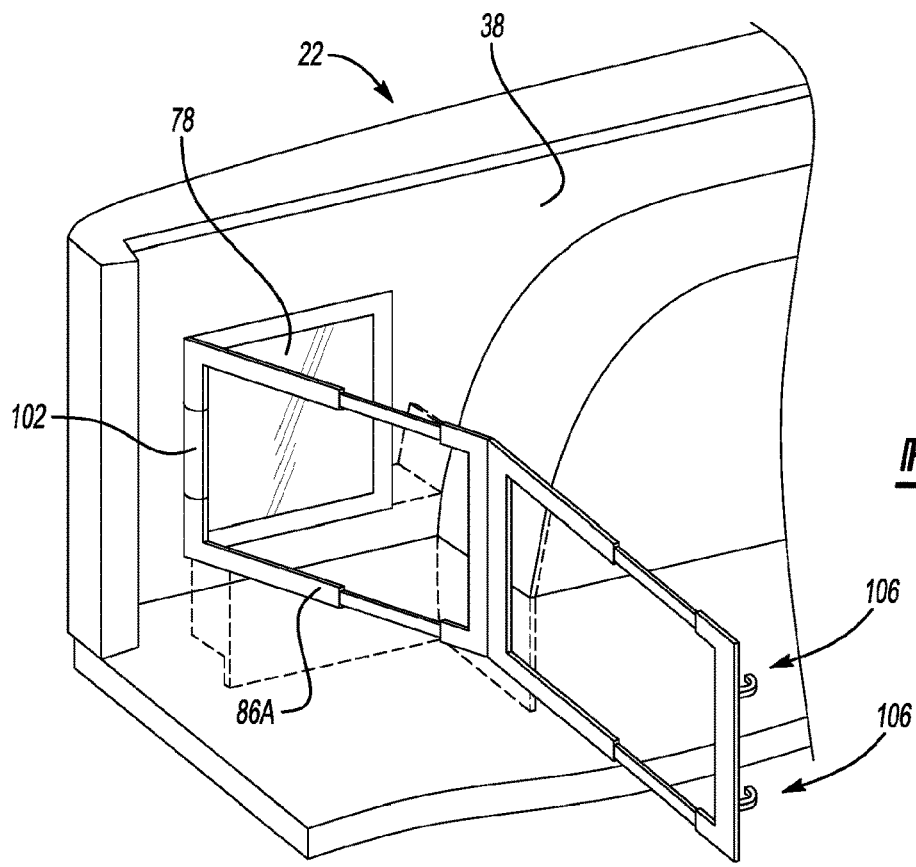

Referring now to FIGS. 8 and 9, a variation of the frame 86A is hinged relative to the inner panel 38 along a vertically extending axis rather than along a horizontally extending axis along a vertical top of the lid 78.

The frame 86A is configured to be folded over itself when in the stowed position shown in FIG. 8. The frame 86A can be extended to a deployed position where the frame 86A extends in a cross-car direction toward the side wall 22 on a passenger's side of the vehicle 10. The frame 86A could incorporate engagement features 106 such as latches or hooks that engage corresponding attachment features on the side wall 22 on the passenger side of the vehicle 10. When the engagement features 106 are engaged with the engagement features on the side wall 22, the engagement securely holds the frame 86A. In a variation of the frame 86A, the frame 86A could extend partway across the cargo bed 14 in a cross-car direction, another frame could extend from the side wall 22 on the passenger side of the vehicle 10. The other frame can connect to the frame 86A near, for example, a center line of the vehicle. The frame 86A, like the frame 86, can extend and retract in a telescoping manner as desired.

Figure 10:
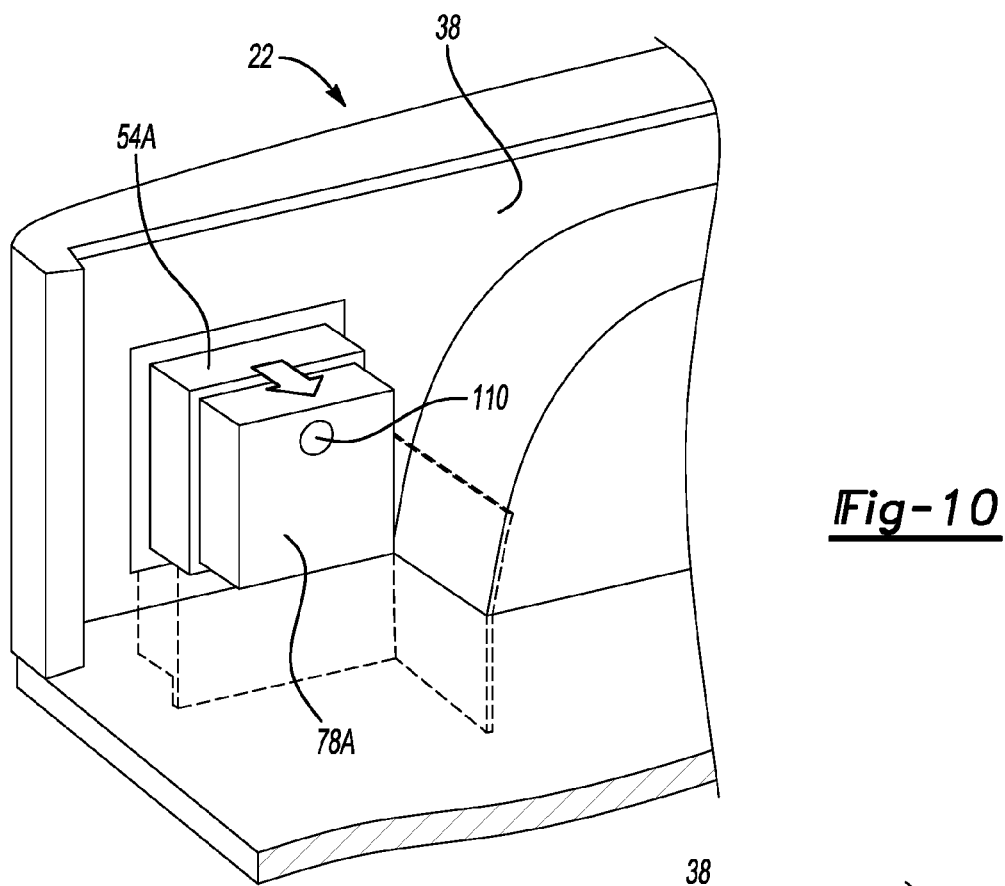
FIG. 10 shows a first bin of the storage system of FIG. 2 according to yet another exemplary aspect of the present disclosure.

FIG. 10 shows yet another variation of a storage system. In this example, the first bin 54A can include a portion that can extend in a telescoping manner toward a center line of the vehicle 10 away from the side wall 22 and the inner panel 38. The telescoping of the first bin 54 can increase a cargo area $CA_1$ associated with the first bin 54A. The telescoping portion of the first bin 54 can be snapped to the other portions of the first bin 54 that are within the cavity C.

The first bin 54A is shown in an extended position in FIG. 10. When in a retracted position, the first bin 54A does not extend toward a centerline of the vehicle 10 as far as when the first bin 54A is in the extended position.

In FIG. 10, the first bin 54A includes a lock assembly 110. The lock assembly 110 is configured to transition back-and-forth between a locked position and an unlocked position. In the embodiment of FIG. 10, the lock assembly 110 blocks telescoping movement of the first bin 54A when the lock assembly 110 is in the locked position. The lock assembly 110 also prevents opening a lid 78A of the first bin 54A when the lock assembly 110 is in the locked position. The lock assembly 110 permits telescoping movement of the first bin 54A and opening of the lid 78A when the lock assembly 110 is in the unlocked position.

Notably, a lock assembly could also be used in connection with the lid 78 of the first bin 54 of the FIGS. 2-9 embodiments. The lock assembly, in such an example, can provide added security by preventing a pivoting of the lid 78 from the closed position when the lock assembly is in a locked position.

In some examples, the lock assembly 110 or the lock used in connection with the embodiments of FIG. 2-9, can transition from a locked position to an unlocked position automatically. The transition may be due to the vehicle 10 recognizing a user approaching the cargo bed 14 as an authorized user.

In some examples, a camera 116 (FIG. 1) on the vehicle 10 can capture images of the user approaching the cargo bed 14. These images can be used in connection with facial recognition software to determine whether or not the individual approaching the cargo bed 14 is an authorized user. Thus, the lock assembly that holds the lid 78 in a closed position or prevents the telescoping of the first bin 54A can be configured to transition at least in part in response to an authorized user detected by the camera 116 of the vehicle 10. In this example, the camera 116 is located in a CHMSL of the vehicle 10. In response to the user leaving an area near the cargo bed 14 without shutting the lid 78, the vehicle 10 may shut the lid 78 automatically.

Figure 11:
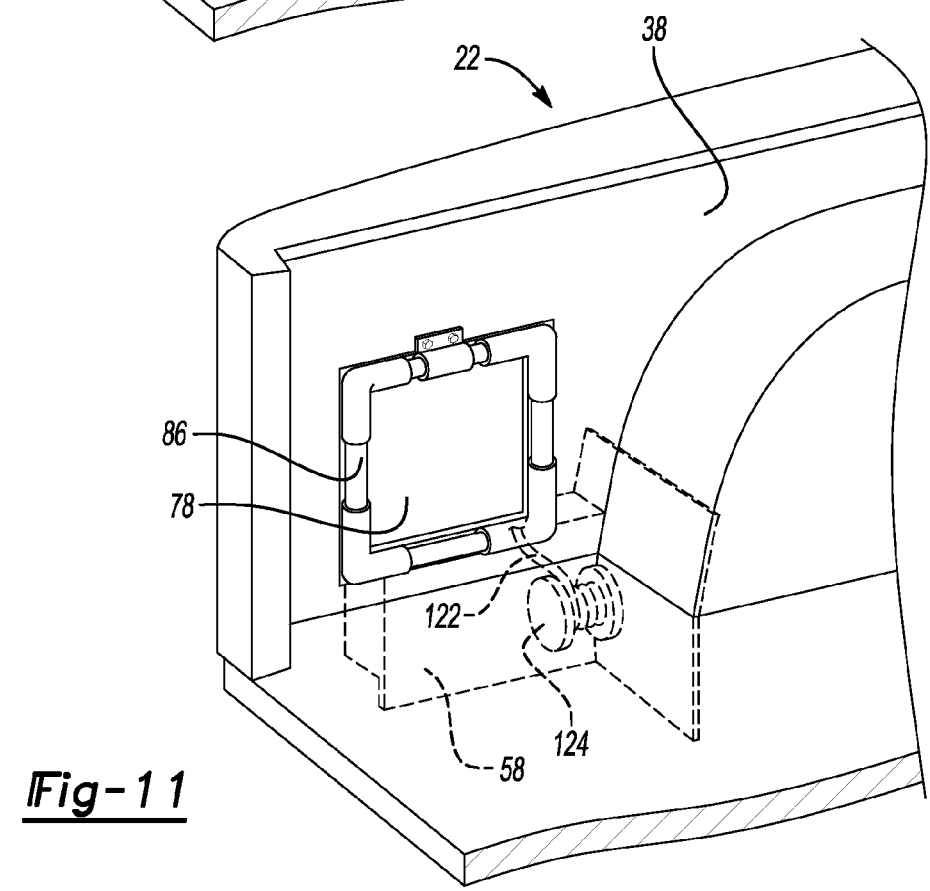
FIG. 11 shows an embodiment where a power cord and a reel are housed within the storage system of FIG. 2.

With reference now to FIGS. 1 and 11, in some examples, a cord 120 can be held within the first cargo area $CA_1$ of the first bin 54, the second cargo area $CA_2$ of the second bin 58, or both. The cord 120 can be wound for storage on a reel 124.

In some examples, the vehicle 10 is an electrified vehicle incorporating a traction battery 126 (FIG. 1) that can be used to drive wheels of the vehicle 10. A user may unroll the cord 120 from the reel 124 and pull the cord 120 through the opening O. The user can then plug the cord into a charging station and use the cord 120 in connection with charging the traction battery 126.

In some examples, the cord 120 can be used for bidirectional charging of the vehicle 10. That is, the traction battery 126 can either be charged utilizing the cord 120, or can be used to charge another traction battery or device through the cord 120.

In another example, the cord 120 can instead or additionally be used as a power source to power a user's tools, for example.

If the user attempts to operate or drive the vehicle 10 with the cord 120 extending through the opening O, the vehicle 10 may provide an alert to the user, such as a visual alert on a touch screen of the vehicle 10 along with a chime, to inform the user that the cord 120 is not stowed.

In some examples, the cord 120 is automatically powered on when the cord is unrolled from the reel 124. When the cord 120 is returned to the stowed position and wound about the reel 124, the cord 120 is automatically turned off.

The vehicle 10 may include an inverter, such as a 400-watt inverter, that can be utilized in connection with providing power from the cord 120. In some examples, the vehicle 10 can monitor current/power draw from the 400-watt inverter. If more than 400-watt from the cord 120 is needed, powering the cord 120 may be prioritized over the vehicle 10 providing power to other areas. In response to more than 400-watts being required, the power to other areas of the vehicle 10 may be shut off, and an alert may be transmitted to a user.

Figure 12:
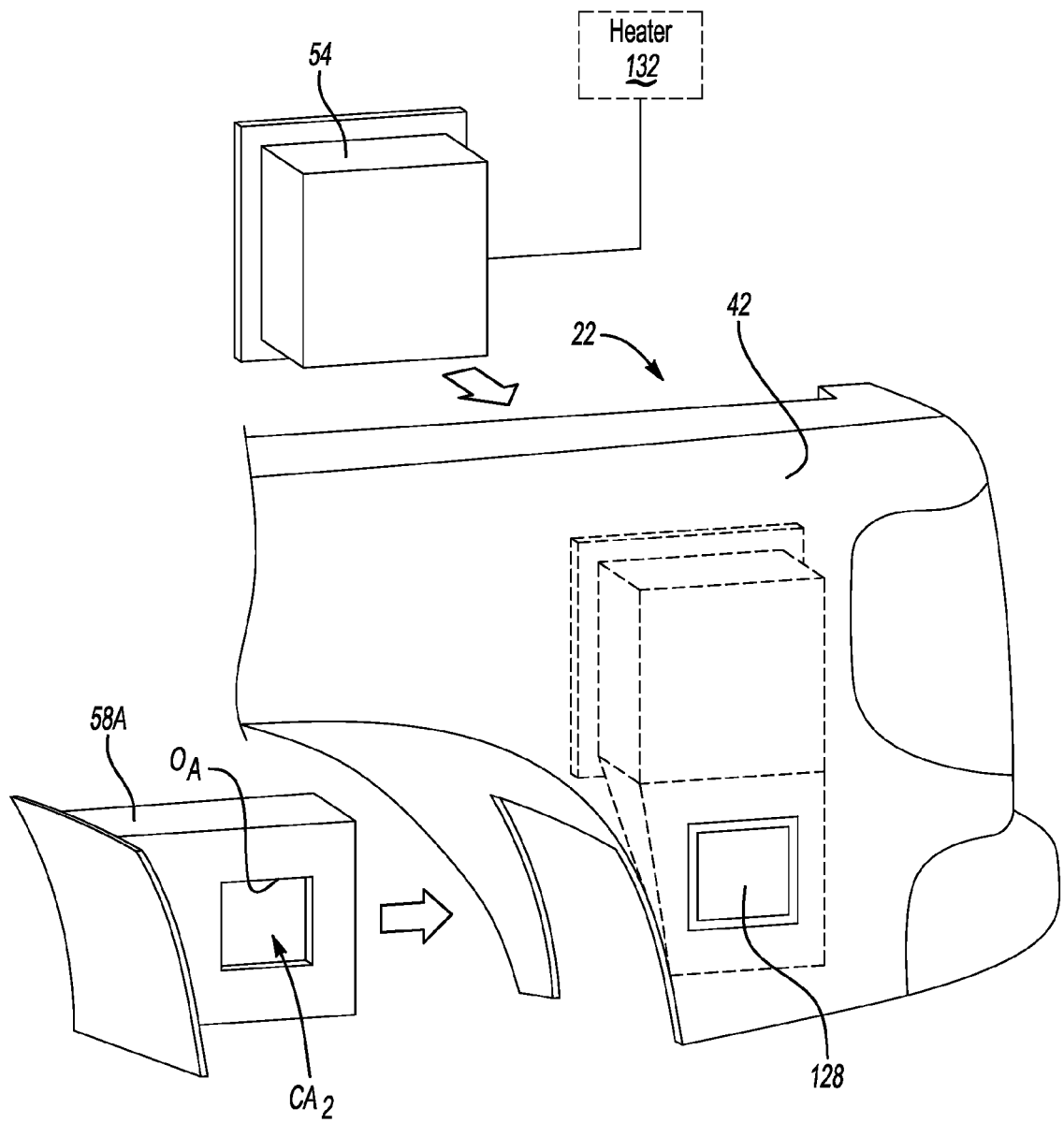
FIG. 12 shows a second bin of the storage system of FIG. 2 according to yet another exemplary aspect of the present disclosure.

FIG. 12 shows another variation of the storage system where the second bin 58A includes an opening $O_A$. A user can access the second cargo area $CA_2$ of the second bin 58A through the opening $O_A$. The user may access the second cargo area $CA_2$ through the opening $O_A$ by opening a lid 128 covering an opening in the outer panel 42 of the side wall 22. Through the opening $O_A$, the user can also access the cargo area $CA_1$ of the first bin 54.

FIG. 12 shows another optional embodiment where the first bin 54 includes a heater 132. The heater 132 could instead be included within the second bin 58A, or in both the first bin 54 and the second bin 58A. The heater 132 can be used to heat area of the cargo bed 14. In some examples, a tent can be pitched over part of the cargo bed 14 such that a user can use the cargo bed 14 for camping or glamping. The heater 132 can be activated to selectively heat an interior of the tented area.

In some examples, a sensor of the vehicle 10, such as a radar sensor, can be relied on to detect the presence of an individual within the tented area. If the tented area is not occupied, the vehicle 10 may automatically turn off the heater 132. The heater 132 could also be controlled such that the heater 132 can only be turned on when the lid 78 is open. The heater 132 can be powered by a battery of the vehicle 10.

If the vehicle 10 is a hybrid vehicle, an engine can automatically crank to provide additional power to the heater 132 as required. The heater 132 can be power by an inserted jumper harness and controlled via wireless commands issued from a Battery Control Module.

Features of the disclosed examples include a storage system that provides cargo areas. The storage system can include multiple housings to facilitate assembly of the storage system into a vehicle wall while providing a relatively large area within which to hold cargo. The multi-piece design facilitates assembly as the entire storage does not need to be moved into a cavity of a wall through a single opening.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
    a wall of a cargo bed, the wall having an inner panel spaced from an outer panel to provide a cavity; and
    a storage system having a first bin and a second bin that are each at least partially disposed within the cavity when in an installed position,
        the first bin providing a first cargo area within the cavity when in the installed position, and configured to be moved to the installed position through an aperture in the inner panel,
        the second bin providing a second cargo area within the cavity when in the installed position, and configured to be moved to the installed position without moving through the aperture in the inner panel, the second cargo area opening to the first cargo area when the first and second bins are in the installed position.

2. The vehicle assembly of claim 1, wherein the first bin is snap-fit to the second bin when the first and second bins are in the installed position.

3. A vehicle assembly, comprising:
    a wall of a cargo bed, the wall having an inner panel spaced from an outer panel to provide a cavity; and
    a storage system having a first bin and a second bin that are each at least partially disposed within the cavity when in an installed position,
        the first bin providing a first cargo area within the cavity when in the installed position, and configured to be moved to the installed position through an aperture in the inner panel,
    the second bin providing a second cargo area within the cavity when in the installed position, and configured to be moved to the installed position without moving through the aperture in the inner panel, wherein the second bin provides part of a wheel well liner when the second bin is in the installed position.

4. The vehicle assembly of claim 1, further comprising a lid that is moveable back-and-forth between a closed position and an open position, the lid covering an opening to the first cargo area when in the closed position, the lid providing access to the first cargo area through the opening when the lid is in the open position.

5. The vehicle assembly of claim 4, further comprising a hinge system that couples the lid relative to the inner panel such that the lid can move back-and-forth between the closed position and the open position, wherein the hinge system biases the lid to the closed position.

6. The vehicle assembly of claim 5, further comprising a frame that is moveable back-and-forth between a stowed position and a deployed position, the hinge system coupling the frame relative to the inner panel.

7. The vehicle assembly of claim 6, wherein the frame is an extendable frame that can extend and retract.

8. The vehicle assembly of claim 6, wherein the frame extends circumferentially continuously about a frame aperture, wherein the frame is configured to extend to increase a size of the frame aperture, and configured to retract to decrease a size of the frame aperture.

9. The vehicle assembly of claim 6, wherein the frame is configured to fold over itself when in the stowed position.

10. The vehicle assembly of claim 4, further comprising a lock assembly that transitions back-and-forth between a locked position and an unlocked position, the lock assembly configured to hold the lid in the closed position when the lock assembly is in the locked position, the lid moveable from the closed position to the open position when the lock assembly is in the unlocked position, wherein the lock assembly is configured to transition from the locked position to the unlocked position in response to a vehicle having the vehicle assembly detecting an authorized user.

11. The vehicle assembly of claim 10, further comprising a camera of the vehicle that captures images of the cargo bed and areas proximate the cargo bed, the lock assembly configured to transition at least in part in response to the authorized user being detected using the camera.

12. The vehicle assembly of claim 1, wherein the first bin is configured to telescope back-and-forth between an extended position and a retracted position, the first bin extending further from the cavity into the cargo area when the first bin is in the extended position than when the first bin is in the retracted position.

13. The vehicle assembly of claim 1, further comprising a cord that is held within the first cargo area, the second cargo area, or both.

14. The vehicle assembly of claim 13, further comprising a traction battery of a vehicle having the cord, the traction battery configured to be charged using the cord, the cord configured to be held on a reel within the first cargo area when stored.

15. The vehicle assembly of claim 1, further comprising a heater configured to be selectively held within the cavity as part of the first bin, as part of the second bin, or as part of both the first and second bin.

16. A method of installing a vehicle assembly, comprising:

moving a first bin through an aperture in an inner panel of a wall into an installed position such that the first bin is at least partially disposed within a cavity between the inner panel and an outer panel of the wall;

without moving a second bin through the aperture, moving the second bin into an installed position such that the second bin is at least partially disposed within the cavity; and securing the first bin and the second bin relative to each other to provide a storage system the first bin having a cargo area that opens to a cargo area of the second bin when the first and second bins are in the installed position.

17. The method of claim 16, further comprising snap-fitting the first bin and the second bin when securing the first bin and the second bin relative to each other.

18. The method of claim 16, further comprising moving the second bin through a wheel well area when moving the second bin to the installed position.

19. The method of claim 16, wherein the second bin provides part of a wheel well liner when the second bin is in the installed position.

20. The method of claim 1, wherein the first bin is joined to the second bin when the first and second bins are in the installed position.

* * * * *

UNITED STATES PATENT AND TRADEMARK OFFICE
CERTIFICATE OF CORRECTION

PATENT NO. : 11,440,479 B2
APPLICATION NO. : 17/173912
DATED : September 13, 2022
INVENTOR(S) : Stuart C. Salter et al.

It is certified that error appears in the above-identified patent and that said Letters Patent is hereby corrected as shown below:

In the Claims

In Claim 20, Column 10, Line 23; replace "claim 1" with --claim 16--

Signed and Sealed this
First Day of November, 2022

Katherine Kelly Vidal
*Director of the United States Patent and Trademark Office*